United States Patent
Shimoguchi

(10) Patent No.: US 8,081,861 B2
(45) Date of Patent: Dec. 20, 2011

(54) OPTICAL DISC APPARATUS

(75) Inventor: Tadashi Shimoguchi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1090 days.

(21) Appl. No.: 11/924,234

(22) Filed: Oct. 25, 2007

(65) Prior Publication Data

US 2008/0101774 A1 May 1, 2008

(30) Foreign Application Priority Data

Oct. 26, 2006 (JP) ................................. 2006-291096

(51) Int. Cl.
*H04N 9/80* (2006.01)
(52) U.S. Cl. ....................................... 386/239; 386/248
(58) Field of Classification Search .................. 386/239, 386/246, 248
See application file for complete search history.

(56) References Cited

U.S. PATENT DOCUMENTS

| | | | |
|---|---|---|---|
| 6,091,674 A | 7/2000 | Tozaki et al. | |
| 6,385,381 B1 * | 5/2002 | Janus et al. | 385/135 |
| 6,577,812 B1 * | 6/2003 | Kikuchi et al. | 386/248 |
| 7,471,873 B2 * | 12/2008 | Wu et al. | 386/263 |
| 7,515,814 B2 * | 4/2009 | Arai et al. | 386/239 |
| 7,742,685 B2 * | 6/2010 | Hong | 386/332 |
| 2004/0015247 A1 * | 1/2004 | Kamiya | 700/51 |
| 2004/0080609 A1 * | 4/2004 | Kakii et al. | 348/14.08 |

FOREIGN PATENT DOCUMENTS

| | | |
|---|---|---|
| JP | 9-251763 A | 9/1997 |
| JP | 2002-271731 A | 9/2002 |
| JP | 2004-213728 A | 7/2004 |
| JP | 2005-276439 A | 10/2005 |

OTHER PUBLICATIONS

Japanese Office Action dated Jun. 2, 2009 (Four (4) pages).
Japanese Office Action dated Sep. 30, 2008 with English translation (Eight (8) pages).

* cited by examiner

*Primary Examiner* — Thai Tran
*Assistant Examiner* — Mishawn Dunn
(74) *Attorney, Agent, or Firm* — Crowell & Moring LLP

(57) ABSTRACT

An optical disc apparatus comprises: a data reading unit for reading VTS_TMAPT and TMU; a preliminary search address calculating unit for calculating, based on the read data and a search time designated by a user, address of a destination VOBU to which an optical pickup is to be moved; a VOBU reading unit for reading a cell time, a VOBU time and video data reproduction time of the destination VOBU; a VOBU determining means for determining whether the designated search time belongs to reproduction time zone of the destination VOBU; and a search address calculating unit for calculating, based on VOBU_SRI data of the destination VOBU, address of a next destination VOBU when the designated search time is determined to be outside the reproduction time zone of the destination VOBU. This disc apparatus can accurately find a point of the designated search time from which to start reproducing video data.

3 Claims, 4 Drawing Sheets

FIG. 3

| POSITION OF VOBU | CONTENT OF VOBU_SRI |
|---|---|
| FWDI 240 | Adress of 240th next VOBU |
| FWDI 120 | Adress of 120th next VOBU |
| FWDI 60 | Adress of 60th next VOBU |
| FWDI 20 | Adress of 20th next VOBU |
| FWDI 15 | Adress of 15th next VOBU |
| FWDI 14 | Adress of 14th next VOBU |
| FWDI 13 | Adress of 13th next VOBU |
| ⋮ | ⋮ |
| FWDI 3 | Adress of 3rd next VOBU |
| FWDI 2 | Adress of 2nd next VOBU |
| FWDI 1 | Adress of 1st next VOBU |
| BWDI 1 | Adress of 1st previous VOBU |
| BWDI 2 | Adress of 2nd previous VOBU |
| BWDI 3 | Adress of 3rd previous VOBU |
| ⋮ | ⋮ |
| BWDI 13 | Adress of 13th previous VOBU |
| BWDI 14 | Adress of 14th previous VOBU |
| BWDI 15 | Adress of 15th previous VOBU |
| BWDI 20 | Adress of 20th previous VOBU |
| BWDI 60 | Adress of 60th previous VOBU |
| BWDI 120 | Adress of 120th previous VOBU |
| BWDI 240 | Adress of 240th previous VOBU |

FIG. 4

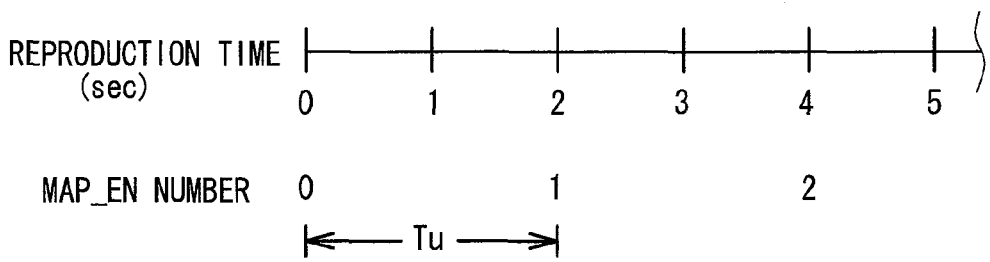

OPTICAL DISC APPARATUS

BACKGROUND OF THE INVENTION

1. Field of the Invention

The present invention relates to an optical disc apparatus, and more particularly to an optical disc apparatus to perform a time search process to find a desired video data for reproduction.

2. Description of the Related Art

An optical disc of DVD (Digital Versatile Disc)-VIDEO format has recorded thereon a video title(s) which includes cells (data cells) formed of VOBUs (Video Object Units). The video title has MAP_EN (Map Entry) numbers sequentially written thereon and from the beginning thereof at intervals of TMU (Time Unit) which is predetermined and specific to the optical disc, and the data of which is written in VTS_TMAPT (Video Title Set Time Map Table) written in turn on the optical disc. When a search time designated or selected by a user, from which to start reproducing video data in the optical disc and which is time from the beginning of the video title, is input to an optical disc apparatus with an optical pickup (such search time being hereafter referred to as "designated search time"), then the optical disc apparatus calculates a MAP_EN number corresponding to the designated search time based on the TMU written in the VTS_TMAPT.

The optical disc apparatus then reads, from the VTS_TMAPT, the address of a VOBU (Video Object Unit) corresponding to the calculated MA_PEN number, and moves the optical pickup to a position corresponding to the thus read address so as to start reproducing video data in the VOBU. This process is called "time search process". For example, if the TMU is 2 seconds and the designated search time is 5 seconds, the MAP_EN number is calculated as 2 from the division of 5÷2=2.5. Thus, the optical disc apparatus reads the address of the VOBU corresponding to the MAP_EN number #2 from the VTS_TMAPT, and moves the optical pickup to a position corresponding to the address for video data reproduction. However, since the time search process is performed at the intervals of the TMU, the actual time from which to start the video data reproduction is likely to be offset or shifted from the designated search time.

In the prior art, there are various optical disc apparatus in this field. For example, Japanese Laid-open Patent Publication 2002-271731 discloses an optical disc apparatus to perform a time search process for an optical disc such that the time point of a then or currently performed video data reproduction is used as a reference time so as to find video data positioned at a designated time (period or distance) forward or backward from the reference time. Further, Japanese Laid-open Patent Publication 2005-276439 discloses an optical disc apparatus to perform a time search process for finding video data in an optical disc at a designated search time regardless of the data compression method. However, each of the optical disc apparatus of these patent publications requires that addresses of VOBUs based on predetermined reproduction time distances forward and backward from a VOBU, at which the optical pickup is then or currently positioned, be recorded on the optical disc.

SUMMARY OF THE INVENTION

An object of the present invention is to provide an optical disc apparatus with an optical pickup that can perform a time search process to accurately find video data in an optical disc even if addresses of VOBUs based on predetermined reproduction time distances forward and backward from a VOBU, at which the optical pickup is currently positioned, are not recorded on the optical disc, thereby increasing the quality of the optical disc apparatus.

According to the present invention, this object is achieved by an optical disc apparatus comprising: an optical pickup unit for irradiating a laser beam onto an optical disc to record/reproduce data on/from the optical disc which has recorded therein a VTS_TMAPT (Video Title Set Time Map Table), including TMU (Time Unit) data, and a video title including cells formed of VOBUs (Video Object Units) according to DVD (Digital Versatile Disc)-VIDEO format, each VOBU having video data and Navi (Navigation) Pack data including VOBU_SRI (Video Object Unit Search Information) data; a laser driver for outputting a laser modulation signal to the optical pickup to drive the optical pickup; a servo controller for controlling focus and tracking of the optical pickup; a memory unit storing a program; and a main controller for controlling the optical disc apparatus based on the program.

Therein, the main controller comprises: a search address calculating unit for calculating address of a VOBU (hereafter referred to as "destination VOBU"), to which the optical pickup is to be moved, based on a search time (hereafter referred to as "designated search time") designated by a user and the VOBU_SRI data in the Navi Pack data of a VOBU corresponding to a current position of the optical pickup; a VOBU reading unit for moving the optical pickup to a cell (hereafter referred to as "destination cell") to which the address of the destination VOBU calculated by the search address calculating unit belongs, so as to read a time (hereafter referred to as "cell time") which is a time from the beginning of the video title to the beginning of the destination cell and is recorded in the destination cell, and for moving the optical pickup to a position corresponding to the address of the destination VOBU so as to read a time (hereafter referred to as "VOBU time") which is a time from the beginning of the destination cell to the beginning of the destination VOBU and is recorded in the Navi Pack data of the destination VOBU, and also read a reproduction time length which is of the video data of the destination VOBU and is recorded in the Navi Pack data of the destination VOBU.

The main controller further comprises: a search time comparing unit for calculating reproduction start time and reproduction end time of the video data from the beginning of the video title, based on the cell time, the VOBU time and the reproduction time length of the video data read by the VOBU reading unit, so as to compare the designated search time with a reproduction time zone of the video data of the destination VOBU from the reproduction start time to the reproduction end time of the video data of the destination VOBU; and a VOBU determining unit for determining, based on a result of the comparison performed by the search time comparing unit, whether the designated search time belongs to the reproduction time zone of the video data of the destination VOBU, so as to find a VOBU having a reproduction time zone of video data to which the designated search time belongs, and thereby to move the optical pickup to a position corresponding to the designated search time.

The optical disc apparatus according to the present invention performs a time search process based on (starting from) address data recorded on one VOBU, at which the optical pickup is currently positioned. The address data recorded on the one VOBU include position data of other VOBUs forward and backward from the one VOBU. Thus, the optical disc apparatus can perform a time search process to accurately find video data in an optical disc based on the position data of other VOBUs even if addresses of other VOBUs based on predetermined reproduction time distances forward and backward from the one VOBU are not recorded on the optical disc. Thereby, the quality of the optical disc apparatus according to the present invention is increased.

Preferably, the optical disc apparatus further comprises a preset moving unit for moving the optical pickup to a position corresponding to the first VOBU in the first cell of the video title (such VOBU being hereafter referred to simply as "first VOBU"), such that when the preset moving unit positions the optical pickup at the position corresponding to the first VOBU, the search address calculating unit calculates the address of the destination VOBU based on the designated search time and the VOBU_SRI data in the Navi Pack data of the first VOBU. The optical disc apparatus according to the preferred mode to preset the first destination VOBU at the first VOBU of the video title makes it possible to simplify the program stored in the memory unit for the time search process.

Further preferably, the optical disc apparatus further comprises: a data reading unit for reading the VTS-TMAPT from the optical disc and further reading the TMU data from the VTS_TMAPT; and a preliminary search address calculating unit for calculating, based on the designated search time and on the VTS_TMAPT and the TMU data read by the data reading unit, address of a VOBU (hereafter referred to as "preliminary destination VOBU") to which the optical pickup is to be preliminarily moved. Therein, the VOBU reading unit moves the optical pickup to a cell (hereafter referred to as "preliminary destination cell") to which the address of the preliminary destination VOBU calculated by the preliminary search address calculating unit belongs, so as to read a time (hereafter referred to as "preliminary cell time") which is a time from the beginning of the video title to the beginning of the preliminary destination cell and is recorded in the preliminary destination cell, and for moving the optical pickup to a position corresponding to the address of the preliminary destination VOBU so as to read a time (hereafter referred to as "preliminary VOBU time") which is a time from the beginning of the preliminary destination cell to the beginning of the preliminary destination VOBU and is recorded in the Navi Pack data of the preliminary destination VOBU, and also read a reproduction time length which is of video data (hereafter referred to as "preliminary video data") of the preliminary destination VOBU and is recorded in the Navi Pack data of the preliminary destination VOBU.

Further, therein, the search time comparing unit calculates reproduction start time and reproduction end time of the preliminary video data from the beginning of the video title, based on the preliminary cell time, the preliminary VOBU time and the reproduction time length of the preliminary video data read by the VOBU reading unit, so as to compare the designated search time with a reproduction time zone of the preliminary video data of the preliminary destination VOBU from the reproduction start time to the reproduction end time of the preliminary video data of the preliminary destination VOBU. When the VOBU determining unit determines that the designated search time is outside the reproduction time zone of the preliminary video data of the preliminary destination VOBU, the search address calculating means calculates the address of the destination VOBU based on the VOBU_SRI data in the Navi Pack data of the preliminary destination VOBU. The optical disc apparatus according to the further preferred mode makes it possible to more securely move the optical pickup to a position corresponding to the designated search time.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 3 is a chart showing a content of VOBU_SRI written in a video title;

FIG. 4 is a chart showing reproduction time of video data recorded on the optical disc and its relation to MAP_EN numbers written in the video data.

DESCRIPTION OF THE PREFERRED EMBODIMENTS

Embodiments of the present invention, as the best mode for carrying out the invention, will be described hereinafter with reference to the annexed drawings.

Figure 1:
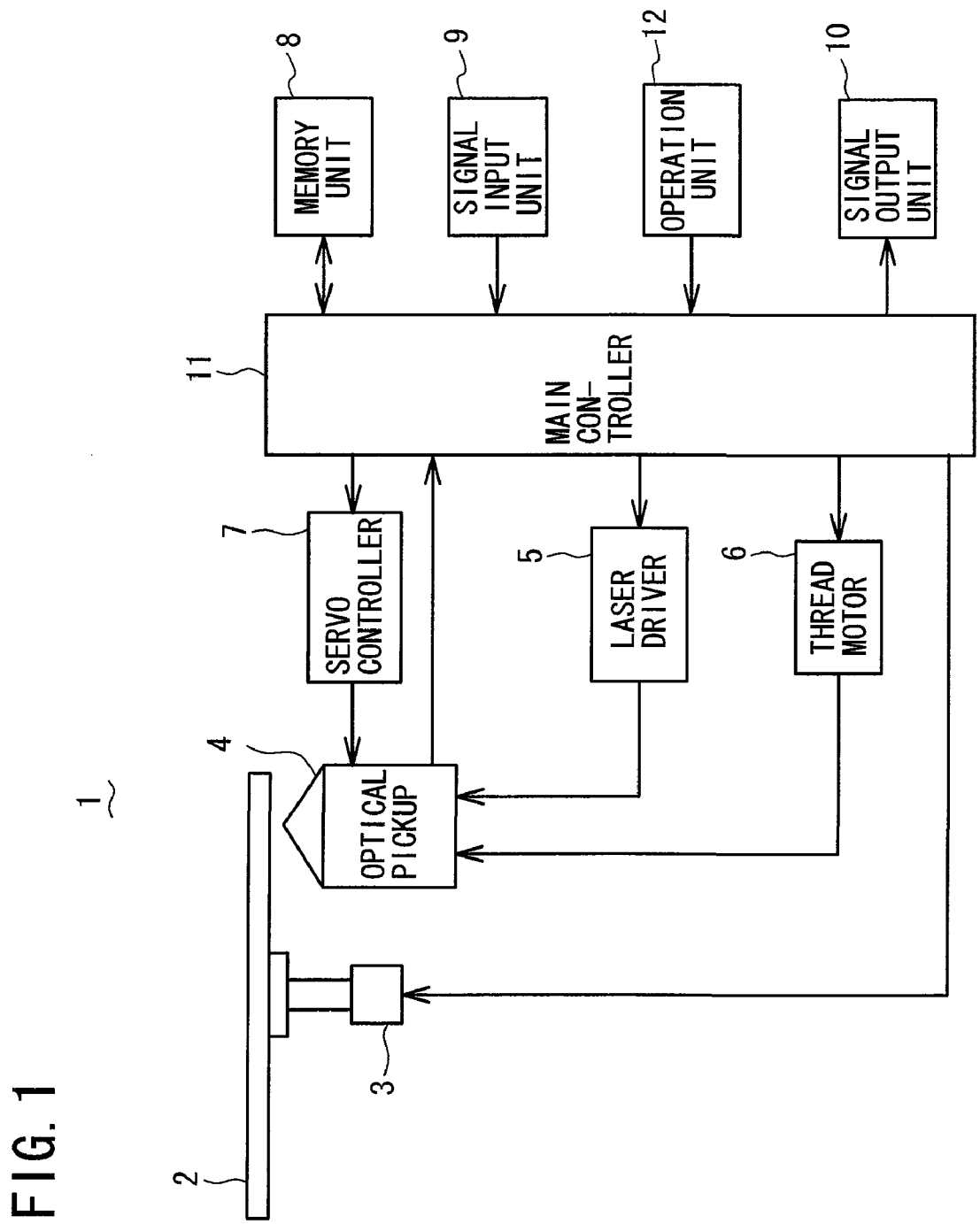
FIG. 1 is a schematic block diagram of an optical disc apparatus according to an embodiment of the present invention.

An optical disc apparatus 1 according to an embodiment of the present invention will be described with reference to FIG. 1 which is a schematic block diagram of the optical disc apparatus 1. The optical disc apparatus 1 comprises: a spindle motor 3 for rotating an optical disc 2 mounted on a turntable; an optical pickup 4 for irradiating a laser beam onto the optical disc 2 to record/reproduce data on/from the optical disc 2; a laser driver 5 for outputting a laser modulation signal to the optical pickup 4 to drive the optical pickup 4; a thread motor 6 for moving the optical pickup 4 in a radial direction of the optical disc 2; a servo controller 7 for controlling focus and tracking of the optical pickup 4; and a main controller 11 for controlling the entire optical disc apparatus 1, or more specifically, the respective units and elements described above. The main controller 11 has connected thereto: a memory unit 8 storing therein e.g. data and a program of time search process described later; a signal input unit 9 for inputting data such as video and audio data; a signal output unit 10 for outputting reproduced data from the optical disc 2; and an operation unit 12 operated by a user to command the main controller 11. The optical disc apparatus 1 is used e.g. as a DVD (Digital Versatile Disc) recorder or a DVD drive installed in a personal computer.

The optical pickup 4 comprises a semiconductor laser diode (not shown) for emitting a laser beam to the optical disc 2 as well as a photodetector (not shown) for receiving reflected light of the laser beam reflected from the optical disc 2 to generate an electrical signal. This semiconductor laser diode irradiates a high power laser beam onto the optical disc 2 so as to record data on the optical disc 2. On the other hand, the photodetector sends, to the main controller 11, the electrical signal which is a reproduced signal generated based on the reflected light from the optical disc 2, so as to reproduce data recorded on the optical disc 2. The operation of the optical disc apparatus 1 will be described below with reference to FIG. 2 to FIG. 4.

Figure 2:
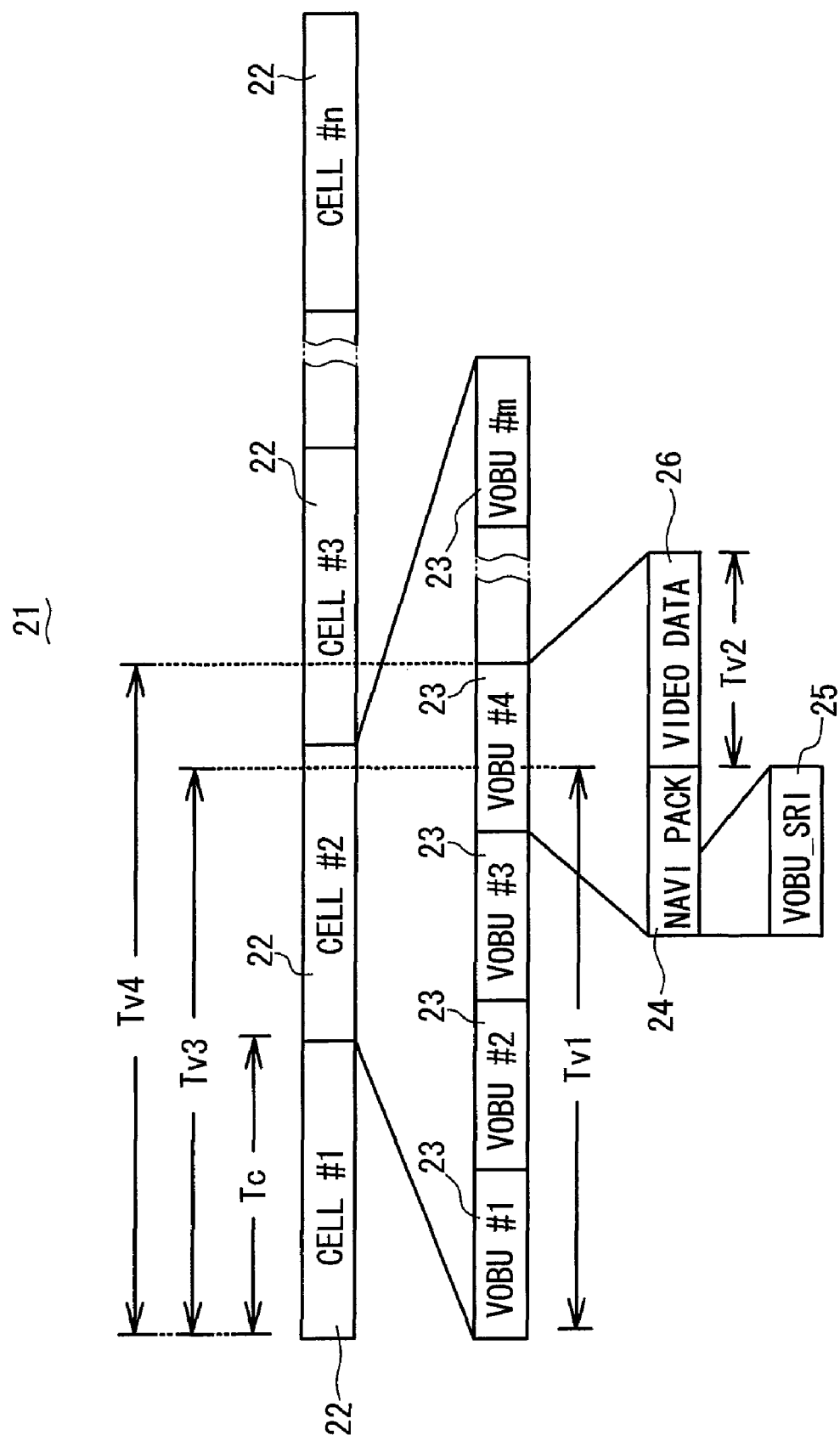
FIG. 2 is a schematic view showing a data structure of a video title recorded on an optical disc.

FIG. 2 is a schematic view showing a data structure of a video title 21 recorded on the optical disc 2, while FIG. 3 is a chart showing a content of VOBU_SRI (Video Object Unit Search Information) 25 written in the video title 21. On the other hand, FIG. 4 is a chart showing reproduction time of video data recorded on the optical disc 2 and its relation to MAP_EN (Map Entry) numbers written in the video data. Referring to FIG. 2, a video title recorded on the optical disc 2 is formed of multiple cells 22, cell #1 to cell #n, including e.g. a series of AV (audio video) signals of a movie, in which each cell 22 is for AV signals of a few seconds to a few minutes. Each cell 22 is formed of multiple VOBUs (Video Object Units) 23, VOBU #1 to VOBU #m. The time (period or length) of video data of each VOBU 23 is provided by a technical standard, and is between 0.4 and 1.0 second.

Each VOBU 23 has a Navi (Navigation) Pack data 24 and video data 26. Each cell 22 has data of time Tc (hereafter referred to as "cell time") recorded therein which is a time from the beginning of the video title 21 to the beginning of the each cell 22, or more precisely from the beginning of video data of the first VOBU 23 of the first cell 22 of the video title 21 to the beginning of video data of the first VOBU 23 of the each cell 22, counting only the video data 26 therebetween. The Navi Pack data 24 of each VOBU 23 of each cell 22 includes data of time Tv1 (hereafter referred to as "VOBU time") recorded therein which is a time from the beginning of the each cell 22 to the beginning of the each VOBU 23, or more precisely from the beginning of video data of the first VOBU 23 of the each cell 22 to the beginning of the video data of the each VOBU 23, counting only the video data 26 therebetween. Note that the term "time" as in the cell time and the VOBU time as well as in "reproduction start time", "reproduction end time" and "designated search time" described later means time of only the video data, assuming that all the video data in the video title 21 are sequentially contiguous to one another, without counting the time of other elements such as the Navi Pack data 24. The Navi pack data 24 also includes data of time Tv2 (hereafter referred to as "reproduction time") recorded therein which is a time (period or length) of the video data 26 of the each VOBU 23.

Each Navi Pack data 24 has VOBU_SRI data 25. Referring to FIG. 3, the VOBU_SRI data 25 of each VOBU 23 has recorded therein address data of certain other multiple VOBUs 23 relative to, or more specifically forward and backward from, the each VOBU 23 together with position data of the certain other VOBUs, representing sequential positions of the certain other VOBUs 23 forward and backward from the each VOBU 23. In FIG. 3, "FWDI" and "BWDI" stand for forward information and backward information. FIG. 4 schematically shows reproduction time of video data recorded on the optical disc 2 and its relation to MAP_EN (Map Entry) numbers written in the video data at intervals of TMU (Time Unit) whose time Tu is predetermined and specific to each optical disc. The MAP_EN numbers are sequentially written in the sequential video data 26 in the sequential VOBUs 23 in the sequential cells 22 of the video title 21 from the beginning of the video title 21, or more precisely from the beginning of the video data 26 of the first VOBU 23 of the first cell #1 in the video title 21. The TMU data (e.g. Tu of 2 seconds) as well as other data including address data of the respective VOBUs 23 are recorded or written in VTS_TMAPT (Video Title Set Time Map Table) which, in turn, is recorded on the optical disc 2.

Figure 5:
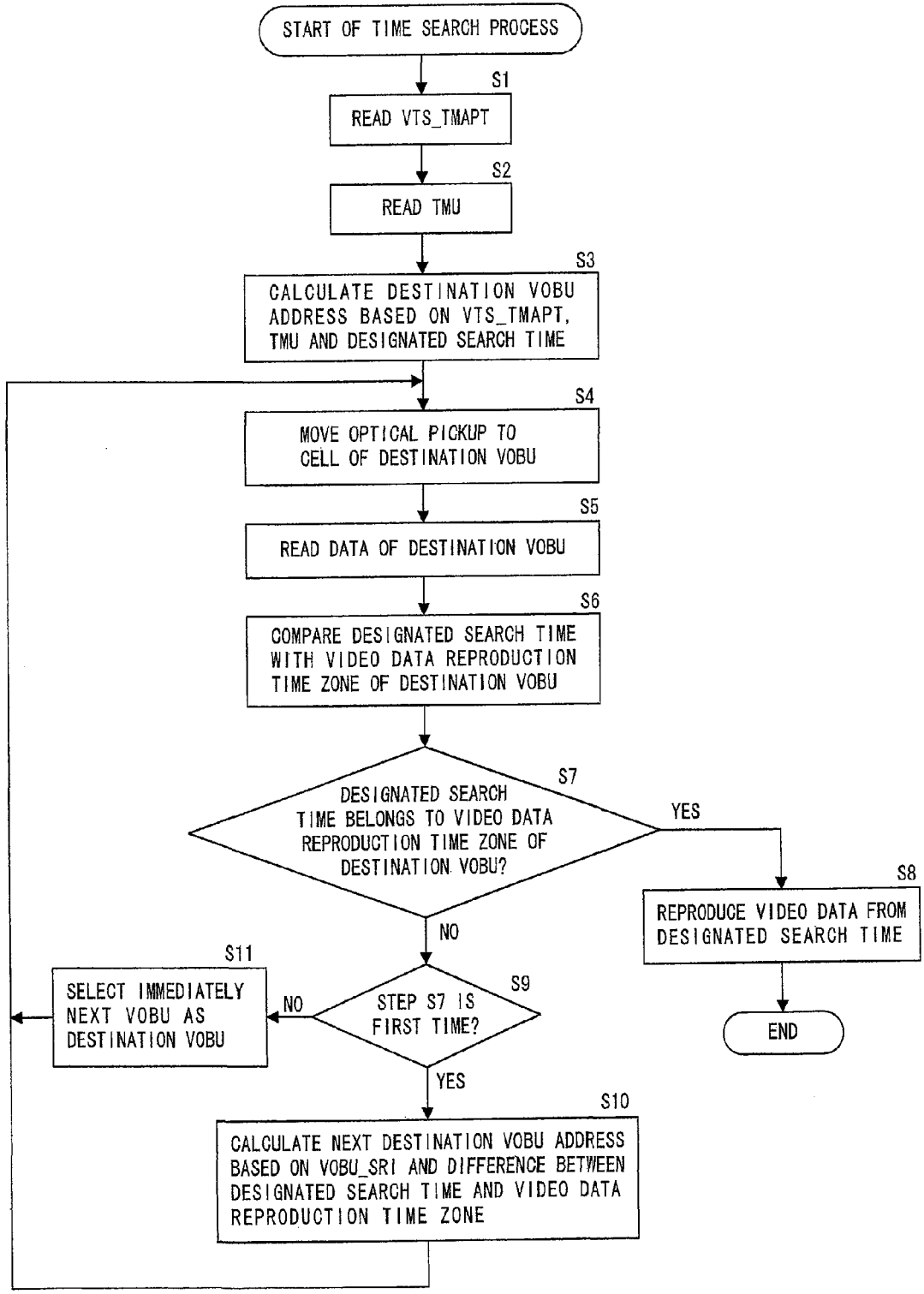
FIG. 5 is a flow chart of a time search process performed by the optical disc apparatus.

Referring now to the flow chart of FIG. 5, a time search process performed by the optical disc apparatus 1 as configured above will be described. When a user operates the operation unit 12 to input a search time (Ts) to the main controller 11 that is a time at which the user wants the optical disc apparatus 1 to start reproducing video data (such search time Ts being referred to as "designated search time"), the main controller 11 starts the time search process, and controls the optical pickup 4, the laser driver 5, the thread motor 6, the servo controller 7, the memory unit 8 and so on to read a VTS_TMAPT from the optical disc 2 (S1), and then to read a time Tu of TMU from the VTS_TMAPT (S2). The main controller 11 together with these elements and units of the optical disc apparatus 1 to perform steps S1 and S2 forms claimed "data reading unit".

Thereafter, the main controller 11 controls to divide the designated search time Ts by Tu (TMU) to calculate a MAP_EN number (in the video data) which is positioned at a position closest to the designated search time and closer to the beginning of the video title than the designated search time. More specifically, the MAP_EN number is the integer part of the quotient of the division:

$$\text{MAP}_{EN} \text{ number} = \text{Integer part of } Ts \div Tu$$

For example, if the designated search time and Tu (TMU) are 5 seconds and 2 seconds, respectively, then the division is 5÷2=2.5, so that the MAP_EN number is 2. Thereafter, the main controller 11 controls to read, from the VTS_TMAPT, the address of a VOBU 23 (e.g. VOBU #4) which corresponds to the thus calculated MAP_EN number, and which can be referred to as found VOBU 23 or destination VOBU 23 (claimed "preliminary destination VOBU") (so that this address can be referred to as destination VOBU address) (S3). The main controller 11 together with other elements and units to perform step S3 forms claimed "preliminary search address calculating unit".

The main controller 11 then controls to move the optical pickup 4 to a position corresponding to a cell 22 to which the destination VOBU 23 (e.g. VOBU #4) belongs, and thus which can be referred to as destination cell 22 (claimed "preliminary destination cell") (S4). The main controller 11 then controls to read, from the destination cell 22, the cell time Tc (claimed "preliminary cell time") of the destination cell 22, and also reads, from the Navi Pack data 24 of the destination VOBU 23, the VOBU time Tv1 and the reproduction time Tv2 of the destination VOBU 23 (S5). The main controller 11 together with other elements and units to perform steps S4 and S5 forms claimed "VOBU reading unit". It is to be noted that as described above, the cell time Tc and the VOBU time Tv1 each mean a time only in terms of video data.

From these data of Tc, Tv1 and Tv2, the main controller 11 controls to calculate a time Tv3 and a time Tv4 ("VOBU reproduction start time" and "VOBU reproduction end time", respectively, that are reproduction start time of video data of the destination VOBU 23) from the beginning of the video title 21 to the beginning and the end, respectively, of the destination VOBU 23, or more precisely from the beginning of the video data 26 in the first VOBU 23 of the first cell 22 to the beginning and end, respectively, of the video data 26 of the destination VOBU 23, only counting the time of video data 26, i.e. only in terms of video data:

$$Tv3 = Tc + Tv1$$

$$Tv4 = Tc + Tv1 + Tv2$$

The main controller 11 controls to compare and determine whether the designated search time Ts belongs to the time zone from the VOBU reproduction start time to the VOBU reproduction end time of the destination VOBU 23 (such time zone being hereafter referred to as "VOBU reproduction time zone" that is a time zone of video data 26 of the destination VOBU 23) by the following expression (S6):

$$Tv3 < Ts < Tv4$$

The main controller 11 together with other elements and units to perform steps S6 forms claimed "search time comparing unit". If the main controller 11 determines that the designated search time Ts belongs to the VOBU reproduction time zone (YES in S7), the main controller 11 controls to reproduce video data 26 of the destination VOBU 23 starting from the point of the designated search time (S8), thereby ending the time search process. The main controller 11 together with other elements and units to perform step 7 forms claimed "VOBU determining unit".

The main controller 11 has a counter (not shown) therein to indicate by the data 1 (one) or 0 (zero) whether or not the search time and time zone determining step S7 has been at least once performed. If the main controller 11 determines that the designated search time Ts does not belong to, i.e. the designated search time Ts is outside, the VOBU reproduction time zone (in this case, the designated search time is always forward from, or after, Tv4 or the end of the video data of the destination or current VOBU 23, because the MAP_EN number is an integer part of Ts÷Tu) (NO in S7), the main controller 11 determines based on the data of the counter whether the step 7 is first time, i.e. whether the step S7 has been performed for the first time (S9). If YES in S9 (counter is 0), the main controller 11 controls to divide the difference between the designated search time Ts and VOBU reproduction end time Tv4 by 1 (one) second (which is the maximum time of VOBU 23) so as to calculate the minimum number M of VOBUs 23 between the destination (i.e. current) VOBU 23 and the designated search time Ts:

$$M=(Ts-Tv4)\div 1$$

If $M \geq 2$, namely, if there are minimum or at least M VOBUs 23 between the destination (i.e. current) VOBU 23 and the designated search time Ts, the main controller 11 controls to read, from the VOBU_SRI data 25 of the destination (i.e. current) VOBU 23, the address of the (M+1)th next VOBU 23 ("next destination VOBU") from, or forward from, the destination (i.e. current) VOBU 23. On the other hand, if M<1, namely, if there is not one (not at least one) VOBU 23 between them, the main controller 11 controls to read, from the VOBU_SRI data 25 of the destination (i.e. current) VOBU 23, the address of the next VOBU 23 ("next destination VOBU"), namely, the VOBU 23 next from the destination (i.e. current) VOBU 23 (S10). The main controller 11 together with other elements and units to perform step 10 forms claimed "search address calculating unit".

Thereafter, the main controller 11 controls to move the optical pickup 4 to a position corresponding to the next destination VOBU 23 ("found VOBU"), i.e. either of the thus read two addresses (S4), and to perform steps 5 to 7 described above in a similar manner. More specifically, the main controller 11 then controls to read, from the cell 22 of the next destination VOBU 23, the cell time Tc (claimed "cell time") of the cell 22, and also reads the VOBU time Tv1 and the reproduction time Tv2 of the next destination VOBU 23 (S5). From these data of Tc, Tv1 and Tv2, the main controller 11 controls to calculate time Tv3 and time Tv4, respectively, of the next destination VOBU 23.

The main controller 11 controls to compare and determine whether the designated search time Ts belongs to the time zone from the VOBU reproduction start time to the VOBU reproduction end time of the next destination VOBU 23. If the main controller 11 determines that the designated search time Ts belongs to the VOBU reproduction time zone (YES in S7), the main controller 11 controls to reproduce video data 26 of the next destination VOBU 23 starting from the point of the designated search time (S8), thereby ending the time search process. On the other hand, if the main controller 11 determines that the designated search time Ts does not belong to, or is outside, the VOBU reproduction time zone (NO in S7), the main controller 11 performs step 9 to determine whether the step 7 is first time (counter is 0 or 1).

The main controller 11 now determines that the step 7 is performed here for the second time (counter is 1 and NO in S9). Thereafter, the main controller 11 selects, from the VOBU_SRI data 25 of the next destination VOBU 23, the address of the immediately next VOBU 23 that is immediately next from the next destination VOBU 23. This immediately next VOBU 23 is now a new destination VOBU 23, and the main controller 11 subjects this immediately next VOBU 23 to subsequent steps S4 to S7 again. In this manner, the optical disc apparatus 1 repeats steps S9, S4, S5, S6 and S7 with each next VOBU 23 by shifting, one-by-one, the VOBU 23 to be checked until finding a VOBU 23 to which the designated search time Ts belongs, so as to reproduce the video data 26 of the found VOBU 23 from the point of the designated search time (S8), thereby ending the time search process.

As described in the foregoing, the optical disc apparatus 1 according to the embodiment of the present invention performs a time search process based on (starting from) address data recorded on one VOBU 23, at which the optical pickup 4 is currently positioned. The address data recorded on the one VOBU 23 include position data of other VOBUs 23 forward and backward from the one VOBU 23. The optical disc apparatus 1 can perform a time search process to accurately find video data 26 in an optical disc 2 based on the position data of other VOBUs 23 even if addresses of other VOBUs based on predetermined reproduction time distances forward and backward from the one VOBU 23 are not recorded on the optical disc 2. This increases the quality of the optical disc apparatus 1. Further, the optical disc apparatus 1 can additionally calculate and find a destination VOBU 23 (for the optical pickup 4 to be moved to) based on the designated search time Ts as well as on the VTS_TMAPT and TMU, so as to make it possible to more securely move the optical pickup 4 to a position corresponding to the designated search time Ts.

It is to be noted that the present invention is not limited to the above-described specific embodiments, and various modifications can be made within the scope of the present invention. For example, the main controller 11 can be modified to additionally comprise a preset moving unit for moving the optical pickup 4 to a position corresponding to the first VOBU 23 in the first cell 22 of the video title 21 (such VOBU 23 being hereafter referred to simply as "first VOBU"), such that when the preset moving unit positions the optical pickup 4 at the position corresponding to the first VOBU, the main controller 11 ("search address calculating unit") controls to calculate the address of a destination VOBU 23 based on the designated search time and the VOBU_SRI data in the Navi Pack data 24 of the first VOBU 23, after subjecting the data of the first VOBU 23 to the time search process described above with reference to the flow chart of FIG. 5 from step S4 onward. In other words, the main controller 11 together with other elements and units to perform such an additional process forms the preset moving unit. Here, the above description of the flow chart should be read by substituting e.g. "first VOBU 23" and "first cell 22" for the "preliminary destination VOBU 23", the "preliminary destination cell 22" and the like. This modification of presetting the first destination VOBU 23 can simplify the program of time search process stored in the memory unit 8.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus comprising: an optical pickup unit for irradiating a laser beam onto an optical disc to record/reproduce data on/from the optical disc which has recorded therein a Video Title Set Time Map Table (VTS_TMAPT), including Time Unit (TMU) data, and a video title including cells formed of Video Object Units (VOBUs) according to DVD-VIDEO format, each VOBU having video data and Navi Pack data including Video Object Unit Search Information (VOBU_SRI) data; a laser driver for outputting a laser modulation signal to the optical pickup to drive the optical pickup; a servo controller for controlling focus and tracking of the optical pickup; a memory unit storing a program; and a main controller for controlling the optical disc apparatus based on the program, wherein the main controller comprises: a search address calculating unit for calculating address of a destination VOBU, to which the optical pickup is to be moved, based on a designated search time designated by a user and the VOBU_SRI data in the Navi Pack data of a VOBU corresponding to a current position of the optical pickup; a VOBU reading unit for moving the optical pickup to a destination cell to which the address of the destination VOBU calculated by the search address calculating unit belongs, so as to read a cell time which is a time from the beginning of the video title to the beginning of the destination cell and is recorded in the destination cell, and for moving the optical pickup to a position corresponding to the address of the destination VOBU so as to read a VOBU time which is a time from the beginning of the destination cell to the beginning of the destination VOBU and is recorded in the Navi Pack data of the destination VOBU, and also read a reproduction time length which is of the video data of the destination VOBU and is recorded in the Navi Pack data of the destination VOBU; a search time comparing unit for calculating reproduction start time and reproduction end time of the video data from the beginning of the video title, based on the cell time, the VOBU time and the reproduction time length of the video data read by the VOBU reading unit, so as to compare the designated search time with a reproduction time zone of the video data of the destination VOBU from the reproduction start time to the reproduction end time of the video data of the destination VOBU; and a VOBU determining unit for determining, based on a result of the comparison performed by the search time comparing unit, whether the designated search time belongs to the reproduction time zone of the video data of the destination VOBU, so as to find a VOBU having a reproduction time zone of video data to which the designated search time belongs, and thereby to move the optical pickup to a position corresponding to the designated search time.

2. The optical disc apparatus according to claim 1, which further comprises a preset moving unit for moving the optical pickup to a position corresponding to the first VOBU in the first cell of the video title, such that when the preset moving unit positions the optical pickup at the position corresponding to the first VOBU, the search address calculating unit calculates the address of the destination VOBU based on the designated search time and the VOBU_SRI data in the Navi Pack data of the first VOBU.

3. The optical disc apparatus according to claim 1, which further comprises: a data reading unit for reading the VTS-TMAPT from the optical disc and further reading the TMU data from the VTS_TMAPT; and a preliminary search address calculating unit for calculating, based on the designated search time and on the VTS_TMAPT and the TMU data read by the data reading unit, address of a preliminary destination VOBU to which the optical pickup is to be preliminarily moved, wherein the VOBU reading unit moves the optical pickup to a preliminary destination cell to which the address of the preliminary destination VOBU calculated by the preliminary search address calculating unit belongs, so as to read a preliminary cell time which is a time from the beginning of the video title to the beginning of the preliminary destination cell and is recorded in the preliminary destination cell, and for moving the optical pickup to a position corresponding to the address of the preliminary destination VOBU so as to read a preliminary VOBU time which is a time from the beginning of the preliminary destination cell to the beginning of the preliminary destination VOBU and is recorded in the Navi Pack data of the preliminary destination VOBU, and also read a reproduction time length which is of preliminary video data of the preliminary destination VOBU and is recorded in the Navi Pack data of the preliminary destination VOBU, wherein the search time comparing unit calculates reproduction start time and reproduction end time of the preliminary video data from the beginning of the video title, based on the preliminary cell time, the preliminary VOBU time and the reproduction time length of the preliminary video data read by the VOBU reading unit, so as to compare the designated search time with a reproduction time zone of the preliminary video data of the preliminary destination VOBU from the reproduction start time to the reproduction end time of the preliminary video data of the preliminary destination VOBU, and wherein when the VOBU determining unit determines that the designated search time is outside the reproduction time zone of the preliminary video data of the preliminary destination VOBU, the search address calculating means calculates the address of the destination VOBU based on the VOBU_SRI data in the Navi Pack data of the preliminary destination VOBU.

* * * * *